United States Patent [19]

McConnell et al.

[11] 4,217,435

[45] Aug. 12, 1980

[54] ADHESIVE COMPOSITION

[75] Inventors: Richard L. McConnell, Kingsport; Doyle A. Weemes, Greeneville, both of Tenn.

[73] Assignee: Eastman Kodak Company, Rochester, N.Y.

[21] Appl. No.: 937,285

[22] Filed: Aug. 28, 1978

Related U.S. Application Data

[63] Continuation of Ser. No. 746,911, Dec. 2, 1976, abandoned.

[51] Int. Cl.² .............................................. C08L 77/00
[52] U.S. Cl. .................... 525/425; 428/246; 525/934
[58] Field of Search ................. 260/857 PE; 525/425

[56] References Cited

U.S. PATENT DOCUMENTS

| | | | |
|---|---|---|---|
| 3,369,057 | 2/1968 | Twilley | 260/857 PE |
| 3,378,056 | 4/1968 | Robertson | 260/857 PE |
| 3,553,288 | 1/1971 | Oda | 260/857 PE |
| 3,650,999 | 3/1972 | Martins | 260/857 PE |
| 3,686,069 | 8/1972 | Winkler | 260/857 PE |
| 3,903,042 | 9/1975 | Gall | 260/857 PE |
| 4,004,960 | 1/1977 | Crowell | 260/857 PE |
| 4,024,204 | 5/1977 | Schlichting | 260/857 PE |
| 4,092,282 | 5/1978 | Callan | 260/857 PE |
| 4,097,445 | 6/1978 | Martins | 260/857 PE |

*Primary Examiner*—Paul Lieberman
*Attorney, Agent, or Firm*—John F. Stevens; Daniel B. Reece, III

[57] ABSTRACT

Composition especially useful as an interlining adhesive comprising a blend of a polyester and a polyamide. The polyester is derived from at least about 40 moles percent terephthalic acid, has a melting point of between about 90° C. and about 140° C. and a heat of fusion of from about 0.1 to about 10 calories per gram. The polyamide has a melting point of between about 50° C. and about 200° C. Such a composition may be melt blended and cryogenically ground to a fine powder size and is resistant to blocking.

13 Claims, No Drawings

ADHESIVE COMPOSITION

This is a continuation of application Ser. No. 746,911 filed Dec. 2, 1976 now abandoned.

This invention relates to mixtures of certain polyesters and certain polyamides useful as hot melt adhesives. Such adhesives, in finely powdered form, are especially useful as fusible interlining adhesives.

A fusible interlining is a material such as a fabric which has been coated on one side with a discontinuous pattern of fusible adhesive. When the interlining is bonded to a face fabric in a garment, it provides body and shape to the garment without impairing the ability of the fabric to breathe. Fusible interlinings are used, for example, in the manufacture of men's and women's suits, in shirt collars and cuffs, and in the waistbands of trousers. In the manufacture of suits, polycarbonate basting threads are frequently used to temporarily hold the parts of the suit in place. After the suit is completed, a solvent such as perchloroethylene or trichloroethylene is used to embrittle the polycarbonate thread so that it may be brushed from the fabric. Trichloroethylene is an especially active solvent and many fusible interlining adhesives dissolve in trichloroethylene. Therefore, resistance to trichloroethylene in the debasting process is a very important property for a useful fusible interlining adhesive.

The polyester-polyamide adhesive mixtures of this invention are to be distinguished from block polyester-polyamide copolymers disclosed in, for example, U.S. Pat. No. 3,849,514. Also, U.S. Pat. No. 3,922,418 discloses heat-sealable sheet material having a coating of crosslinkable polyamide and suitable crosslinking agent. U.S. Pat. No. 3,492,368 relates to dyeable articles, such as fibers comprising heterogeneous blend of particular polyesters and particular polyamides. U.S. Pat. No. 3,853,665 relates to polyester-wax fusion adhesives.

Certain polyamide terpolymers are used as fusible interlining adhesives. The polymers used are generally terpolymers containing nylon 6, nylon 66, and nylon 10, 11 or 12 units. These polymers generally melt at about 100° C. and are used in the form of fine powders. Although used commercially, these polyamide powders have certain deficiencies. For example, polyamides absorb large amounts of moisture and block in the presence of high relative humidity conditions. Therefore, they must be carefully stored in containers prior to being used. Garments bonded with polyamide-based fusible interlinings pucker badly when laundered. Also, polyamides have inadequate bond strength on rainwear fabrics and tend to strike through on lightweight or on dark fabrics, giving them an undesirable appearance.

Certain polyesters are useful for fusible interlining applications. However, these polymers also tend to have certain disadvantages. For example, one polyester of interest is the copolyester of terephthalic acid, adipic acid, ethylene glycol and 1,4-butanediol as described in U.S. Pat.No. 3,699,921. Such polyesters tend to block in pellet form and Cab-O-Sil fumed silica, a product of Cabot Corporation, must be added in significant amounts to make it possible to grind this polymer into powder. Excessive amounts of Cab-O-Sil in the powder, however, prevent good coatability and good fusion of the powders on the fusible interlining fabric when applied with powder point applicators, for example, those made by Caratsch. Also, these polyesters are not resistant to trichloroethylene.

The polyester-polyamide blends of this invention have a high degree of effectiveness in solving the above-mentioned problems. They provide excellent adhesion to a variety of fibrous substrates and are particularly effective in resisting extended contact with dry cleaning and other solvents.

It is, therefore, an object of the present invention to provide hot melt adhesives which may be employed for the successful lamination or bonding of a wide variety of domestic, industrial and other fabrics, as well as the bonding of various other substrates such as metal, wood, rubber, plastic sheeting, glass and other materials, either to themselves or to other materials.

It is another object of this invention to provide hot melt adhesive compositions comprising a polyamide and polyester which may be melt blended, and which may be ground into finely divided form to a substantially non-tacky, nonblocking powder.

A further object is to provide hot melt adhesive compositions which have a sufficiently low softening temperature as to enable them to be readily employed in laminating and other bonding operations, but yet not sufficiently low to cause degeneration or weakening of the adhesive bond under conditions of use or maintenance.

A still further object is to provide hot melt adhesives which will not only function satisfactorily in the bonding of fabric, but also will provide a bond in the finished product which will resist the action of dry cleaning solvents and will be sufficiently flexible to enable the bonded fabric to flex or bend in its normal use without cracking in the bonding layer.

The polyester component of the invention is prepared by conventional techniques, for example, by ester interchange of one or more of the selected glycols with one or more of the selected dicarboxylic acids (see, for example, British Pat. No. 1,047,072). In accordance with this invention, the polyester contains at least 40 mole percent terephthalic acid or an ester thereof such as dimethyl terephthalate. The polyester is further characterized as having a melting point of between about 90° and about 140° C., an inherent viscosity of between about 0.5 and about 1.2, and a heat of fusion ($\Delta H_f$), as defined hereinafter, of less than about 10 calories per gram, preferably about 1 to about 8 calories per gram.

Up to about 60 mole percent of the dicarboxylic acid used in the polyester may be selected from aliphatic, alicyclic, and aromatic difunctional dicarboxylic acids. Examples of such acids include oxalic; malonic; dimethylmalonic; succinic; glutaric; adipic; trimethyl adipic; pimelic; 2,2-dimethylglutaric; azelaic; sebacic; suberic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; isophthalic; t-butyl isophthalic; 2,5-norbornanedicarboxylic; 1,4-naphthalic; diphenic; 4,4'-oxidibenzoic; diglycolic; 2,2,4-trimethyladipic; 4,4'-sulfonyldibenzoic; 2,5-naphthalenedicarboxylic; 2,6-naphthalenedicarboxylic; and 2,7-naphthalenedicarboxylic acids. It will be understood that the corresponding esters of these acids are included in the term "dicarboxylic acid." Examples of these esters include dimethyl-1,4-cyclohexanedicarboxylate; dimethyl-2,6-naphthalenedicarboxylate; dimethyl-4,4'-sulfonyldibenzoate; dimethyl isophthalate; dimethyl terephthalate; and diphenyl terephthalate.

Especially preferred as the acid component is a combination of terephthalic acid and adipic acid in amounts of about 60–80 mole percent and about 40–20 mole percent respectively.

In general, aliphatic, alicyclic, and aromatic difunctional diols can be used to prepare the polyesters. Examples of such diols include ethylene glycol; propylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol, 1,2-cyclohexanedimethanol; 1,3-cyclohexanedimethanol; 1,4-cyclohexanedimethanol; 2,2,4,4-tetramethyl-1,3-cyclobutanediol; o-, m-, and p-xylylene diols; 4,4'-sulfonyldiphenol; 4,4'-oxydiphenol; 4,4'-isopropylidenediphenol; and 2,5-naphthalenediol.

Especially preferred is a combination of ethylene glycol and 1,4-butanediol in amounts of 20–80 mole percent and 80–20 mole percent respectively. The dicarboxylic acids and glycols are selected to form a polyester having the properties mentioned above.

The polyamides with may be used in accordance with this invention are characterized as polymers and copolymers having a melting point of less than about 200° C., preferably from about 50° C. to about 190° C., and an inherent viscosity of from about 0.5 to about 1.2. Polymers selected from nylon 6, nylon 66, nylon 10, nylon 11 and nylon 12 having a melting point of between about 100° C. and about 140° C. are especially preferred. The term copolymer is intended to mean a polymer having more than one monomeric repeat unit. Thus, terpolymer, tetrapolymer, etc., are included. Nylon 6 and nylon 66 are most desirably used as copolymers with nylon 10, nylon 11 or nylon 12. Nylon 6 is the polyamide made from epsilon-caprolactam; nylon 66 is the polyamide made from hexamethylene diamine and adipic acid; nylon 10 is the polyamide made from azacycloundecan-2-one; nylon 11 is the polyamide made from azacyclododecan-2-one; and nylon 12 is the polyamide made from taurolactam.

Such polyamides are long chain synthetic polymeric amides which have recurring amide groups as an integral part of the main polymer chain, and which recurring intralinear carbonamide groups in the polyamides are separated by at least two carbon atoms. The polyamides useful in the present invention may be made by any of the well known processes. For example, polyamides can be made by the polymerization of amino acids such as omega-amino undecanoic acid, by the polycondensation of lactams such as azacyclododecan-2-one, or by condensation of various dicarboxylic acids such as adipic and sebacic acids with diamines such as hexamethylene and octamethylene diamines. Dicarboxylic acids and diamines are selectively chosen to result in polyamides having the described properties.

In general, aliphatic, alicyclic, and aromatic difunctional dicarboxylic acids can be used to prepare the polyamides. Examples of such acids include oxalic; malonic; dimethylmalonic; succinic; glutaric; adipic, trimethyladipic; pimelic; 2,2-dimethylglutaric; azelaic; sebacic; suberic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic, isophthalic; t-butyl isophthalic; 2,5-norbornanedicarboxylic; 1,4-naphthalic; diphenic; 4,4'-oxydibenzoic; diglycolic; 2,2,4-trimethyladipic; 4,4'-sulfonyldibenzoic; 2,5-naphthalenedicarboxylic; 2,6-naphthalenedicarboxylic; and 2,7-naphthalenedicarboxylic acids. It will be understood that the corresponding esters of these acids are included in the term "dicarboxylic acid." Examples of these esters include dimethyl-1,4-cyclohexanedicarboxylate; dimethyl-2,6-naphthalenedicarboxylate; dimethyl-4,4'-sulfonyldibenzoate; dimethyl isophthalate; dimethyl terephthalate; and diphenyl terephthalate.

In general, aliphatic, alicyclic, and aromatic difunctional diamines can be used to prepare the polyamide. Examples of such diamines include polymethylenediamines of the formula $H_2N(CH_2)_xNH_2$, wherein x is a positive integer of from 2 to 12(such as ethylenediamine, trimethylenediamine, tetramethylenediamine, pentamethylenediamine, hexamethylenediamine, heptamethylenediamine, octamethylenediamine, monamethylenediamine, decamethylenediamine, undecamethylenediamine, and dodecamethylenediamine); 1,1-, 1,2-, 1,3-, and 1,4-cyclohexanebis(methylamines); o-, m-, and p-xylene-$\alpha,\alpha'$-diamines; 1,2-, 1,3- and 1,4-cyclohexanediamines; 3-methylhexamethylenediamine; 3-methylheptamethylenediamine; 2,4-dimethylhexamethylenediamine; 2,4-toluenediamine; p,p'-diphenyldiamine; 1,4-dimethyl-3,5-diaminobenzene; 2,5-norcamphanebis(methylamine); o-, m-, and p-phenylenediamines; 2,5-, 2,6-, and 2,7-naphthalenediamines; 4,4'-methylenedianiline; and 3,4'-diaminodiphenyl. N,N'-diphenyldiamines can also be employed.

In accordance with this invention, the blend contains from about 3% up to about 90% by weight polyamide based on the combined weight of polyester and polyamide. It is preferred to use no more than 75% polyamide, while from about 3% to about 30% polyamide is most desirable to avoid launderability problems and strike-through on lightweight fabrics.

Although not required in the practice of this invention, small amounts of stabilizers, pigments, colorants, anticaking agents, fluorescent agents or other additives normally used in fusible interlining applications may be used if desired.

The polyester/polyamide blends are readily made in the melt phase in typical blending equipment. Suitable equipment for making these melt blends includes Brabender plastograph, extruders, Brabury mixers, and the like.

These blends are readily put into powder form using conventional grinding techniques, preferably by cryogenic grinding. The powders nonblocking and can be readily applied to fusible interlining fabrics from powder point applicators, from random sprinkling equipment, or in the form of a paste. The particles are finely divided, i.e., from about 1 micron to about 500 microns and the size required for each of these three types of applications, however, is generally quite critical. For example, in the application of powders from powder point applicators, it is desirable to have powders with a particle size range of 50–200 microns (270–70 mesh). For random sprinkling application on tightly woven or nonwoven fabrics, particle size of 150–300 microns (100–50 mesh) is desirable. For random sprinkling on open-weave fabrics such as cheap rayon/cotton blends, powders with 300–500 micron size (50–35 mesh) are required. For application of powder in paste form, it is necessary to have very fine powders. For example, in paste form, powder size should be 1–80 micron (less than 200 U.S. mesh). Powders are readily prepared from the blends of this invention either by cryogenic grinding.

The hot melt adhesives according to this invention are especially desirable because of their good grindability, i.e., ability to be ground into a finely divided, free-flowing powdery form by conventional grinding techniques, and their resistance to blocking or caking during storage.

It has been found that $\Delta H_f$ is an important property which has a significant effect or grindability. When $\Delta H_f$ exceeds about 10 calories per gram, the grindability of the polymer is adversely affected as will be illustrated hereinafter. While polymers having very low $\Delta H_f$ values are useful in accordance with this invention, as a practical matter, $\Delta H_f$ of 0.1 is about the lower limit.

Whenever the term "inherent viscosity" (I.V.) is used in this application, it will be understood to refer to viscosity determinations made at 25° C. using 0.25 gram of polymer per 100 ml. of a solvent composed of 60 percent phenol and 40 percent tetrachloroethane.

For purposes herein, the term "melting point" ($T_m$) means that temperature at which the solid and liquid phases of the material are at equilibrium at atmospheric pressure.

The "heat of fusion" $\Delta H_f$ of polymers is the amount of heat evolved when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

As indicated above, when copolyesters prepared as described above are employed as melt adhesives to laminate various fabric systems, metal strips and the like, excellent bonds result. These bonds are found to be highly resistant to the action of dry cleaning solvents such as perchloroethylene. The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

One method for determining the grindability of polymer samples is to cryogenically grind 10 g. of polymer pellets for 1 minute in the presence of liquid nitrogen in a Micromill marketed by Chemical Rubber Company. The powder obtained is dried and seived through a 70 mesh screen. The grindability of a sample is defined as the percentage of powder which will pass through the 70 mesh screen.

The following examples are submitted for a better understanding of the invention. In the examples an engraved roll applicator is used to deposit a small dot pattern of powder on the fabric which is fused by heat lamps.

EXAMPLE 1

990 Grams of polyester pellets prepared from 70 mole percent terephthalic acid, 30 mole percent adipic acid, 73 mole percent ethylene glycol, and 27 mole percent 1,4-butanediol (I.V.=0.73; $T_m$=127° C.; $\Delta H_f$=4.2 cal/gm.) and 110 grams of Gril-tex IP8-2 nylon (a terpolymer of nylon 6, nylon 66, and nylon 10, 11 or 12; I.V.=0.89; $T_m$=90°-105° C.; sold by Emser Werke, A.G.) are physically blended and extruded in a Brabender extruder at 205° C. and 150 rpm into 23° C. water and chopped into ¼ inch pellets. The pellets are cryogenically ground through a 0.01 inch mesh screen, dried in a vacuum oven at 50° C. and sieved to obtain power <140 mesh. The powder is free-flowing with no caking tendencies. The powder has a bulk density of 55.5 g./100 cc. (determined by placing 3 g. of powder into a graduated cylinder and tapping it until the powder stops settling). This powder is coated on cotton interlining fabric at a coating weight of 10.8 g./yd². No powder caking is observed during the coating operation. The coated interlining is bonded to 65:35 polyester:cotton fabric using a temperature of about 320° F. (160° C.), and a pressure of 3 psi, for 10 seconds. The bonded specimens have an initial T-peel strength of 3.0 lb./in. and 2.5 lb./in. after trichloroethylene treatment (4 minutes at 23° C.). Bonded samples of interlining made with the same polyester not blended with polyamide (coating weight 12.9 g./yd²; initial T-peel strength 2.8 lb/in.) fall apart during trichloroethylene treatment.

Similarly good results are achieved when interlining coated with the 90/10 polyester/polyamide blend are bonded to the face fabric at 120° C., using the same polyester and polyamide.

EXAMPLE 2

The procedure of Example 1 is repeated except that 0.1% Cab-O-Sil is added to the powder after the sieving step. The coating weight of this powder on the fusible interlining fabric is 10.6 g./yd². Interlining bonded to polyeste:cotton face fabric at 160° C. has an initial T-peel strength of 2.6 lb./in. and 2.1 lb./in. after trichloroethylene treatment. This amount of Cab-O-Sil does not adversely affect the good coating and bonding properties of the 90/10 polyester-polyamide blend.

EXAMPLE 3

The procedure of Example 1 is repeated except the powder is sieved through a 70 mesh screen. Fusible interlining is made with this powder at a coating weight of 13.2 g./yd². Bonds made by heat sealing this fusible interlining to polyester:cotton face fabric at 160° C. have and initial T-peel strength of 2.9 lb./in. and 2.3 lb./in. after trichloroethylene treatment. Similarly, good bonding results are obtained when fusible interlining is borded to doubleknit polyester, texturized polyester, tropical worsted blend fabric (65:25:15 polyester: rayon:mohair blend), and polyester:cotton poplin rainwear fabric at temperatures of about 120 to about 160° C.

EXAMPLE 4

The procedure of Example 3 is repeated except that 0.1% Cab-O-Sil is added to the powder after the sieving step. Specimens of interlining (coating weight, 11.9 g./yd²) bonded to polyester:cotton face fabric have initial T-peel strength of 2.8 lb./in. and a bond strength of 2.3 lb./in. after trichloroethylene treatment.

EXAMPLE 5

The same polyester (194 g.) and polyamide (6 g.) as described in Example 1 are melt blended in a Brabender extruder and chopper into pellets. The pellets are cryogenically ground into <70 mesh powder and coated with 0.25% Cab-O-Sil. This blend coats well on cotton interlining fabric, as described in Example 1 and the fusible interlining has a coating weight of 9.9 g./yd². Bonds are made on polyester:cotton face fabric at 305° F., (152° C.) 4.5 psi for 15 seconds. Bonded specimens have an initial T-peel strength of 2.3 lb./in. and 0.85 lb./in. aftertrichloroethylene treatment.

EXAMPLE 6

The same polyester (250 g.) described in Example 1 and 250 g. of Gril-tex IP8-2 polyamide powders are melt blended in a Brabender extruder and chopped into pellets. The pellets are cryogenically ground to provide <70 mesh powder. Interlining made by coating this powder blend on cotton fabric has a coating weight of 8.9 g./yd$^2$. Specimens bonded to polyester face fabric at 152° C. have an initial T-peel strength of 2.4 lb./in. and 1.4 lb./in. after trichloroethylene treatment.

EXAMPLE 7

Example 5 is repeated, except 50 g. of polyester powder and 150 g. of polyamide powder are used. Interlining coated with powder from a powder point applicator has a coating weight of 8.1 g./yd$^2$. Specimens bonded to polyester:cotton fabric at 152° C. have an initial T-peel strength at 2.7 lb./in. and 2.2 lb./in. after trichloroethylene treatment.

EXAMPLE 8—(Control)

Pellets of the same polyester described in Example 1 (40.5 g.) and Versalon 1138, a polyamide sold by General Mills Chemicals, Inc., (4.5 g.; I.V.=0.39; $T_m$=96° C.) are blended in a Brabender Plastograph at 175° C. under a nitrogen atmosphere for 6 minutes. The granulated blend is cryogenically ground through 0.01 inch screen, dried in a 50° C. vacuum oven and sieved to obtain <70 mesh powder. The powder is coated on cotton interlining fabric and bonded to polyester:cotton face fabric in a manner similar to that used in Example 1. The bonded specimens have an initial T-peel strength of 1.9 lb./in. and fall apart during trichloroethylene treatment. Similar results are obtained with a 75/25 polyester/Versalon 1138 blend is used.

EXAMPLE 9

The polyester described in Example 1 (20 g.) and 180 g. of Gril-tex IP8-2 powder are blended and ground into powder according to the procedure of Example 5. The powder blend is readily coated on cotton interlining fabric to provide interlining with a coating weight of 12 g./yd$^2$. This interlining is fused to face fabric at 100° C. using 4.5 psi pressure and 15 seconds dwell time. An initial T-peel strength of 3.6 lb./in. is obtained. After treating bonded samples with trichloroethylene for 4 minutes and then drying the samples, the T-peel strength is 3.4 lb./in.

EXAMPLE 10

A 50/50 blend of the polyester described in Example 1 and Gril-tex IP8-2 polyamide is made according to the procedure of Example 5. This blend is cryogenically ground to provide <50 mesh powder. The powder is applied to interlining fabric using random sprinkling equipment (coating weight 10.5 g./yd$^2$). This interlining is readily bonded to 65:35 polyester:cotton face fabric at 120°-160° C., 4.5 psi pressure, 15 seconds dwell time. T-peel strengths of bonded samples initially and after treatment with trichloroethylene are 3.5 and 3.3 lb./in., respectively.

Similar results are obtained when the same polyester and polyamide powder blends (powder size <200 mesh) are applied to interlining fabric in paste form.

EXAMPLE 11

Pellets of the same polyester described in Example 1 (90 g.) and Gril-tex IP8-2 polyamide (10 g.; I.V.=0.89; $T_m$=90°-105° C.) are physically blended and extruded in a Brabender extruder at 205° C. and 150 rpm into 23° C. water and chopped into one-fourth inch pellets. These pellets (10 grams) are cryogenically ground in a micromill and sieved through a 70 mesh screen. Powder from the blend contains 34% of <70 mesh while the polyester alone provides only 10% powder of <70 mesh. Powder from this blend (<70 mesh) is coated on cotton interlining (10 grams/square yard) and bonded to 65:35 polyester:cotton fabric in a manner similar to that described in Example 1. The bonded specimen has a T-peel strength of about 2.9 lb./in.

EXAMPLE 12

The procedure of Example 11 is repeated except that nylon 10 (10 g.; I.V.=0.85; $T_m$=177° C.) is used. The blend has a grindability rating of 31%. The polyester alone has a grindability rating of only 10%.

EXAMPLE 13

The procedure of Example 11 is repeated except that Gril-tex IP8-2 polyamide is replaced with nylon 12 (10 g.; I.V.=1.06; $T_m$=178° C.). This blend has a grindability rating of about 34% as compared to 10% for the polyester alone. Powder from this blend (<70 mesh) is coated on cotton interlining (10.1 grams/square yard) and bonded to 65:35 polyester:cotton fabric in a manner similar to that described in Example 1. The bonded specimen has a T-peel strength of about 2.9 lb./in. and about 2.5 lb./in. after a trichloroethylene treatment (four minutes at 23° C.).

EXAMPLE 14

The procedure of Example 11 is repeated except that Gril-tex IP8-2 polyamide is replaced with nylon 11 (10 g.; $T_m$=188° C.). This blend has a grindability rating of about 32% as compared with 10% for the unmodified polyester. Powder from this blend (<70 mesh) is coated on cotton interlining (10.5 grams/square yard) and bonded to 65:35 polyester:cotton fabric in a manner similar to that described in Example 1. The bonded specimen has a T-peel strength of about 3.0 lb./in. and about 2.6 lb./in. after a trichloroethylene treatment (four minutes at 23° C.).

EXAMPLE 15

The procedure of Example 11 is repeated using polyester prepared from terephthalic acid, 80 mole percent 1,6-hexanediol and 20 mole percent 1,4-butanediol (90 g.; I.V.=0.75; $T_m$=127° C.; $\Delta H_f$=8.1) and Gril-tex polyamide (10 g.; I.V.=0.89; $T_m$=90°-105° C.) in the blend. The blend has a grindability rating of 12% compared to 6% for the same polyester used alone. Powder from the blend (<70 mesh) is coated on cotton interlining (10.1 grams/square yard) and bonded to 65:35 polyester:cotton fabric in a manner similar to that described in Example 1. The bonded specimen has a T-peel strength of about 2.7 lb./in. and about 2.3 lb./in. after a trichloroethylene treatment (four minutes at 23° C.).

EXAMPLE 16

The procedure of Example 11 is repeated using the polyester described in Example 15 (90 g.) and nylon 12

(10 g.; I.V.=1.06; $T_m$=178° C.) in the blend. The blend has a grindability rating of 20% as compared to 6% for the same polyester alone. Powder from the blend (<70 mesh) is coated on cotton interlining (9.9 grams/square yard) and bonded to 65:35 polyester:cotton fabric in a manner similar to that described in Example 1. The bonded specimen has a T-peel strength of about 2.6 lb.in. and about 2.2 lb./in. after a trichloroethylene treatment (four minutes at 23° C.).

EXAMPLE 17

The procedure of Example 11 is repeated using the polyester described in Example 15 (90 g.) and nylon 11 (10 g.; $t_m$=188° C.) in the blend. The blend has a grindability rating of 22% as compared to 6% for the same polyester used alone. Powder from the blend (<70 mesh) is coated on cotton interlining (10 grams/square yard) and bonded to 65:35 polyester:cotton fabric in a manner similar to that described in Example 1. The bonded specimen has a T-peel strength of about 2.7 lb./in. and about 2.3 lb./in. after a trichloroethylene treatment (four minutes at 23° C.).

Unless otherwise specified, all ratios, percentages, etc., are on a weight basis.

The invention has been described in detail with particular reference to certain preferred embodiments thereof, but it will be understood that variations and modifications can be effected within the spirit and scope of the invention.

We claim:

1. A hot melt adhesive composition comprising a heterogeneous mixture in finely divided form of
   (A) from about 10% to about 97% by weight of a polyester having a melting point of between about 90° and about 140° C. and a heat of fusion of from about 0.1 to about 10 calories per gram, said polyester being selected from the group consisting of
      (a) polyesters derived from a mixture of dicarboxylic acids, about 40 to about 80 mole percent thereof being terephthalic acid or a derivative thereof and the balance being selected from aliphatic, alicyclic and aromatic dicarboxylic acids other than terephthalic, and at least one glycol containing from 2 to 8 carbon atoms, and
      (b) polyesters derived from terephthalic acid or a derivative thereof and at least one glycol having from 2 to 8 carbon atoms, with the provision that when said polyester contains ethylene glycol, said ethylene glycol is less than about 80 mole percent of the glycol,
   (B) and from about 90% to about 3% by weight of a polyamide having a melting point of from about 50° C. to about 200° C.,
said polyester and said polyamide having inherent viscosities of from about 0.5 to about 1.2 as measured at 25° C. using 0.25 gram of polymer per 100 ml. of a solvent composed of 60% phenol and 40% tetrachloroethane.

2. An adhesive composition according to claim 1 comprising from about 70% to about 97% by weight of said polyester and from about 30% to about 3% of said polyamide.

3. An adhesive composition according to claim 1 comprising about 85% to about 97% by weight of said polyester and from about 15% to about 3% of said polyamide.

4. An adhesive composition according to claim 1 wherein from about 15 to about 45 mole percent of the glycol component is 1,4-butanediol.

5. An adhesive composition according to claim 1 wherein said polyester is derived from a glycol component consisting essentially of ethylene glycol and 1,4-butanediol, and a dicarboxylic acid component consisting essentially of terephthalic acid and adipic acid.

6. An adhesive composition according to claim 1 wherein said polyamide is a terpolymer of nylon 6, nylon 66 and a member selected from the group consisting of nylon 10, nylon 11, and nylon 12.

7. An adhesive composition according to claim 1 wherein said polyamide is selected from the group consisting of nylon 10, nylon 11, and nylon 12.

8. An adhesive composition according to claim 1 wherein the glycol component of said polyester consists essentially of at least one glycol containing from 2 to 8 carbon atoms.

9. Method of preparing a finely-divided, free-flowing hot melt adhesive powder which comrpises
   (A) melt blending from about 10% to about 97% by weight of a polyester having a melting point of between about 90° and about 140° C. and a heat of fusion of from about 0.1 to about 10 calories per gram, said polyester being selected from the group consisting of
      (a) polyesters derived from a mixture of dicarboxylic acids, about 40 to about 80 mole percent thereof being terephthalic acid or a derivative thereof and the balance being selected from aliphatic, alicyclic and aromatic dicarboxylic acids other than terephthalic, and at least one glycol containing from 2 to 8 carbon atoms, and
      (b) polyesters derived from terephthalic acid or a derivative thereof and at least one glycol having from 2 to 8 carbon atoms, with the provision that when said polyester contains ethylene glycol, said ethylene glycol is less than about 80 mole percent of the glycol,
   and from about 90% to about 3% by weight of a polyamide having a melting point of from about 50° C. to about 200° C., said polyester and said polyamide having inherent viscosities of from about 0.5 to about 1.2 as measured at 25° C. using 0.25 gram of polymer per 100 ml. of a solvent composed of 60% phenol and 40% tetrachloroethane;
   (B) forming solid bodies from the blend resulting from (A); and
   (C) cryogenically grinding said solid bodies into said powder.

10. Method of preparing a finely-divided, free-flowing hot melt adhesive powder which comprises
   (A) melt blending from about 70% to about 97% by weight of a polyester derived from a glycol component of which from about 15 to about 45 mole percent is 1,4-butanediol and a dicarboxylic acid component of which at least about 40 to 80 mole percent is terephthalic acid or a derivative thereof and the balance being selected from aliphatic, alicyclic, and aromatic dicarboxylic acids other than terephthalic, said polyester having a melting point of between about 90° and about 140° C. and a heat of fusion of from about 0.1 to about 10 calories per gram, and from about 30% to about 3% by weight of a polyamide having a melting point of from about 50° C. to about 200° C., said polyester and said polyamide having inherent viscosities of from about 0.5 to about 1.2 as measured at 25° C. using 0.25 gram of polymer per 100 ml. of a solvent composed of 60% phenol and 40% tetrachloroethane;

(B) forming solid bodies from the blend resulting from (A); and (C) cryogenically grinding said solid bodies into said powder.

11. Method of preparing a finely-divided, free-flowing hot melt adhesive powder which comprises (A) melt blending from about 85% to about 97% by weight of a polyester derived from a glycol component of which from about 15 to about 45 mole percent is 1,4-butanediol and a dicarboxylic acid component of which at least about 40 to 80 mole percent is terephthalic acid or a derivative thereof and the blanace being selected from aliphatic, alicyclic, and aromatic dicarboxylic acids other than terephthalic, said polyester having a melting point of between about 90° and about 140° C. and a heat of fusion of from about 0.1 to about 10 calories per gram, and from about 15% to about 3% by weight of a polyamide having a melting point of from about 50° C. to about 200°C., said polyester and said polyamide having inherent viscosities of from about 0.5 to about 1.2 as measured at 25° C. using 0.25 gram of polymer per 100 ml. of a solvent composed of 60% phenol and 40% tetrachloroethane;

(B) forming solid bodies from the blend resulting from (A); and (C) cryogenically grinding said solid bodies into said powder.

12. Method of preparing a finely-divided, free-flowing hot melt adhesive powder which comprises (A) melt blending from about 70% to about 97% by weight of a polyester derived from a glycol component consisting essentially of ethylene glycol and 1,4-butanediol and a dicarboxylic acid component consisting essentially of adipic acid and terephthalic acid or a derivative thereof said terephthalic acid or derivative thereof being present in an amount between about 40 to 80 mole percent, the balance being adipic acid, said polyester having a melting point of between about 90° and about 140° C. and a heat of fusion of from about 0.1 to about 10 calories per gram, and from about 30% to about 3% by weight of a terpolymer of nylon 6, nylon 66 and a member selected from the group consisting of nylon 10, nylon 11, and nylon 12, having a melting point of from about 50° C. to about 200° C., said polyester and said polyamide having inherent viscosities of from about 0.5 to about 1.2 as measured at 25° C. using 0.25 gram of polymer per 100 ml. of a solvent composed of 60% phenol and 40% tetrachloroethane;

(B) forming solid bodies from the blend resulting from (A); and (C) cryogenically grinding said solid bodies into said powder.

13. Method of preparing a finely-divided, free-flowing hot melt adhesive powder which comprises (A) melt blending from about 70% to about 97% by weight of a polyester having a melting point of between about 90° and about 140° C. and a heat of fusion of from about 0.1 to about 10 calories per gram, said polyester being selected from the group consisting of (a) polyesters derived from a mixture of dicarboxylic acids, about 40 to about 80 mole percent thereof being terephthalic acid or a derivative thereof and the balance being selected from aliphatic, alicyclic and aromatic dicarboxylic acids other than terephthalic, and at least one glycol containing from 2 to 8 carbon atoms, and (b) polyesters derived from terephthalic acid or a derivative thereof and at least one glycol having from 2 to 8 carbon atoms, with the provision that when said polyester contains ethylene glycol, said ethylene glycol is less than about 80 mole percent of the glycol, and from about 30% to about 3% by weight of a polyamide selected from the group consisting of nylon 10, nylon 11 and nylon 12 having a melting point of from about 50° C. to about 200° C., said polyester and said polyamide having inherent viscosities of from about 0.5 to about 1.2 as measured at 25° C. using 0.25 gram of polymer per 100 ml. of a solvent composed of 60% phenol and 40% tetrachloroethane;

(B) forming solid bodies from the blend resulting from (A); and (C) cryogenically grinding said solid bodies into said powder.

* * * * *